(12) United States Patent
Beck et al.

(10) Patent No.: US 8,353,200 B2
(45) Date of Patent: Jan. 15, 2013

(54) ARRANGEMENT AND PROCESS FOR THE DETECTION OF THE SHARPNESS OF CHOPPER KNIVES

(75) Inventors: Folker Beck, Maβweiler (DE); Martin Schäfer, Hirstein (DE)

(73) Assignee: Deere & Company, Moline, IL (US)

( * ) Notice: Subject to any disclaimer, the term of this patent is extended or adjusted under 35 U.S.C. 154(b) by 559 days.

(21) Appl. No.: 12/609,230

(22) Filed: Oct. 30, 2009

(65) Prior Publication Data
US 2010/0126258 A1 May 27, 2010

(30) Foreign Application Priority Data

Nov. 25, 2008 (DE) .................. 10 2008 044 055

(51) Int. Cl.
*B23Q 17/09* (2006.01)
*G01N 19/08* (2006.01)
(52) U.S. Cl. ......................................................... 73/104
(58) Field of Classification Search ...................... 73/104
See application file for complete search history.

(56) References Cited

U.S. PATENT DOCUMENTS

| 6,886,314 B2 * | 5/2005 | Pirro et al. ................ 56/10.2 R |
| 6,931,828 B2 * | 8/2005 | Kormann ...................... 56/250 |
| 7,024,924 B2 * | 4/2006 | Heinrich et al. ............... 73/104 |
| 2002/0009964 A1 | 1/2002 | Wolf et al. |
| 2007/0209344 A1 | 9/2007 | Berkeley |

FOREIGN PATENT DOCUMENTS

| DE | 4133043 | 4/1993 |
| DE | 19903153 | 3/2000 |
| DE | 10235919 | 2/2004 |
| SU | 1436930 | 11/1988 |

OTHER PUBLICATIONS

Eurasian Search Report, Apr. 16, 2010, 4 Pages.
European Search Report, Sep. 19, 2011, 4 pgs.

* cited by examiner

*Primary Examiner* — Daniel Larkin

(57) ABSTRACT

An arrangement for detection of the sharpness of chopper knives that can be moved relative to a shear bar includes a sensor that detects the effective cutting forces directly or indirectly and an evaluation arrangement connected to the sensor. The evaluation arrangement integrates the measured values of the sensor over time in order to generate information concerning the sharpness of the chopper knives.

15 Claims, 8 Drawing Sheets

ARRANGEMENT AND PROCESS FOR THE DETECTION OF THE SHARPNESS OF CHOPPER KNIVES

FIELD OF THE INVENTION

The invention concerns arrangements and a process for the determination of the sharpness of agricultural chopper knives that can be moved relative to a shear bar and more particularly to such arrangements having a sensor for the determination of a magnitude depending on the cutting force and an evaluation arrangement connected to the sensor.

BACKGROUND OF THE INVENTION

In agricultural forage harvesters the sharpness of the chopper knives is a significant factor in the quality of the cut and is also a factor in the spacing between the shear bar and the chopper knives, and the power required for the cutting operation, since the cutting force increases significantly with dull chopper knives. Usually the operator of the forage harvester recognizes from the cutter sounds, the rotational speed of the drive motor and/or the quality of the chopper cut the time at which a grinding process is required, in order to sharpen the chopper knives again. Here it is seen as a disadvantage that the recognition of the sharpness of the chopper knives by the operator is subject to subjective influences and determinations and accordingly is not very exact. Since the sharpness of the chopper knives at the beginning of the grinding cycle is not known precisely, the determination of the duration of the grinding is also problematic, so that in many cases either too much or too little material is ground off the chopper knives, which leads in the first case to unnecessary wear, and in the second case to inadequate sharpness of the chopper knives.

In order to improve the accuracy of the recognition of the sharpness of the chopper knives and to control the grinding process automatically, various procedures have been described.

DE19903153C1 proposes measuring the forces applied by the chopper knives to the shear bar in the radial, as well as the tangential direction, and to form a quotient from these that represents a measure of the sharpness of the chopper knives.

According to DE10235919A1 the acceleration of the shear bar is detected and subjected to a frequency analysis. On the basis of the harmonic wave spectrum a determination can be made whether the chopper knives are still sufficiently sharp or not.

Moreover, DE4133043A1 proposes that the number of cutting operations in a cutting machine be detected in order to initiate a grinding process and to initiate a grinding process after reaching a predetermined number of cutting operations.

Finally US 2007/0209344 A1 describes a lawn mower in which the drive power of the cutting spindle is detected. If it exceeds a predetermined threshold value, the operator is advised to perform a grinding operation.

In the state of the art it is seen as detrimental that the procedure based on the detection of the cutting angle, according to DE19903153C1 and DE10235919A1, does not always operate accurately enough, since the cutting forces depend not only on the sharpness of the chopper knives and their distance from the shear bar, but also upon mechanical properties of the chopped harvested crop and its through put. A direct determination of the number of cutting processes according to DE4133043A1 is not feasible in the case of a forage harvester, while a detection of the drive power requirement analogous to US 2007/0209344 A1 would also not lead to sufficiently accurate measurement values due to the effect of the material properties of the harvested crop and the spacing between the shear bar and the chopper knives.

SUMMARY OF THE INVENTION

The purpose underlying the invention is seen in the need to make available an improved arrangement for the determination of the sharpness of the chopper knives as against the state of the art described above.

In each cutting process of the chopper knives forces are applied to the shear bar that lead to the chopping of the harvested crop but also to the wear or the process of dulling the chopper knives. The magnitude of the cutting forces or the cutting energy as well as the number of cutting processes performed by the cutting knives is decisive for the wear of the chopper knives. The underlying idea of the present invention lies in the fact that the wear of the knives is correlated with a time integral of the cutting forces or the cutting energy. Therefore a sensor measures a magnitude dependent upon the cutting forces applied to the chopping of the harvested crop and a signal dependent upon the magnitude detected is integrated over time by an evaluation arrangement, in order to generate information regarding the sharpness of the chopper knives.

The information so generated can be used by a preferred embodiment of the invention to determine the duration of grinding and/or a number of grinding processes, with which the chopper knives can again be brought into a sharpened condition. This process has the advantage that the grinding process can occur at any desired, appropriate time, for example, during operation on public roads, and conforms automatically to the actual condition of sharpness of the chopper knives.

The evaluation arrangement calculates the duration of grinding and/or the number of grinding processes preferably in such a way that after the grinding process a sharpened condition of the chopper knives has been reached that corresponds to the condition of the chopper knives after the last, previous grinding process or a reference sharpness value.

In order to be able to consider properties of the harvested crop or other effects, the duration of the grinding recommended by the evaluation arrangement or the number of grinding cycles can be varied upward or downward by a correction factor provided as input to the evaluation arrangement.

In another embodiment the evaluation arrangement can compare the information thus determined regarding the sharpness of the chopper knives with a threshold value, so that if a sharpness of the chopper knives, provided as input, is not reached it can automatically initiate a grinding process, in which it informs the operator correspondingly and/or it activates the grinding process automatically, after the flow of the harvested crop has been interrupted by the operator or by other forces.

Preferably the effective cutting forces are detected by a vibration measurement. A single vibration sensor can be used that is sensitive in the direction of the effective cutting forces, or at least one vibration sensor is used that is sensitive in two directions different from each other, for example, orthogonal to each other. In the second case the resulting cutting forces are determined, in which the signals that can be superimposed vectorally in two different directions in such a way that the resulting signal is a measure of the vibrations extending in the direction of the cut. For this purpose the signals associated with the various directions of the vibration sensor can be added vectorally, in that they are raised to the second power, the squares added and finally the square root drawn from the result. In place of a vibration measurement the effective cutting forces, however, can also be detected by force sensors that are arranged, for example, between the shear bar and the bed of the shear bar supported on the frame of the forage harvester.

The vibration sensor or the vibration sensors can be attached directly to the shear bar or to the bed of the shear bar or at any desired other location in the forage harvester at which the vibrations generated by the cutting process can be detected, for example on the bearing support of the chopper drum.

The signals of the sensor are preferably filtered before the integration in order to eliminate disturbing effects as far as possible. The limiting frequencies of the filtration can be provided as a fixed or variable input. A spectral analysis of the vibrations generated by the chopper knives can be performed during the design of the evaluation arrangement or automatically by it during the operation, in order to establish a limiting frequency as close as possible, so that the filters permit the passage of only the vibrations generated by the chopper knives.

Moreover, the form of the enveloping curve of the signal can be considered by the evaluation in order to detect the impact of the cutting process. For this purpose in particular, the peak factor of the enveloping curve can be determined. This is then integrated by the evaluation arrangement, in order to attain information regarding particularly hard impacts experienced by the chopper knives that are associated with particular wear of the chopper knives and thereby affect the sharpness of the chopper knives. Alternately or in addition the cutting energy is determined in that the thickness of the mass of harvested crop is multiplied with the cutting force and its product is then integrated over time. In both these evaluation processes an analysis can be made, that is a consideration of the rotational speed of the chopper drum, and the signals of the individual cutting processes.

In a preferred embodiment a characteristic of the invention is summed up or integrated over time that is proportional to the immediate rate of wear of the knives and is formed on the basis of the spectral resolution of the vibrations generated by cutting process. For this purpose the amplitudes of the vibrations detected by the vibration sensor in a narrow band about the cutting frequency of each knife (that is, the number of cutting processes performed by the knife in a unit of time) as well as the amplitudes of the integral multiples (harmonics) of the cutting frequencies. For this purpose filtering of the signals of the vibration sensor can be performed (over time), or a Fourier transformation is performed, in order to transform and analyze the signals in the frequency range. The aforementioned amplitudes can be weighted and summed up in order to calculate the characteristic, that is, a weighted factor is associated with the fundamental frequency and each harmonic, with which the immediate amplitudes is multiplied, and then the individual products are summed up, in order to determine the characteristic. In addition to the pure amplitude spectra, spectra derived from these also apply, such as the spectral power density, (PSD power spectral density that defines the energy distribution of the signal upon the frequencies detected) and logarithmic amplitude or a logarithmic power density.

Finally a characteristic may be stored in memory of the evaluation arrangement, with which the latter compensates for a non-linear course between the time integral of the sensor signals so far detected and the sharpness of the chopper knives.

BRIEF DESCRIPTION OF THE DRAWINGS

The several embodiments of the invention are described in greater detail below with reference to the accompanying drawings wherein.

DESCRIPTION OF THE PREFERRED EMBODIMENT

Figure 1:
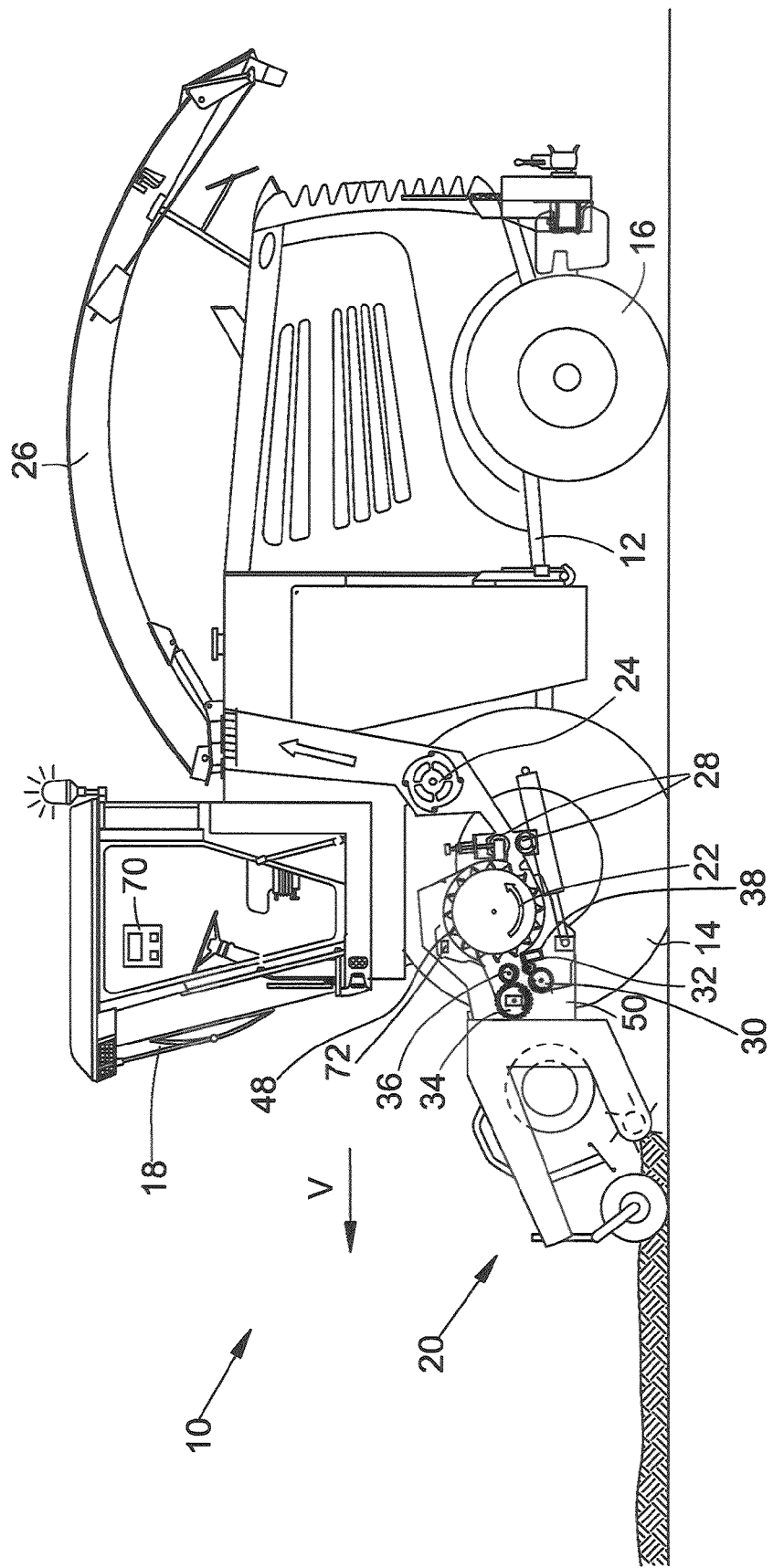
FIG. 1 is a schematic side view of a harvesting machine, to which the arrangement, according to the invention, is applied.

A harvesting machine 10, shown in FIG. 1, in the form of a self propelled forage harvester is supported by a frame 12 that is carried by front and rear wheels 14 and 16. The harvesting machine 10 is controlled from an operator's cab 18, from which a harvested crop take up arrangement 20 in the form of a pick-up can be controlled visually. Crop taken up from the ground by means of the harvested crop take-up arrangement 20, for example, grass or the like, is conducted to a chopper drum 22 equipped with chopper knives 48, that chops it into small pieces and delivers it to a conveyor arrangement 24. The crop is discharged from the harvesting machine 10 to a trailer operating alongside via an outlet duct 26 that can be rotated. A post chopper reduction arrangement 28 is located between the chopper drum 22 and the conveyor arrangement 24 through which the crop that is to be conveyed is conducted tangentially to the conveyor arrangement 24. Between the harvested crop take-up arrangement 20 and the chopper drum 22 the crop is transported by lower pre-pressing rolls 30, 32 and upper pre-pressing rolls 34, 36.

Now reference will be made to FIG. 2, on the basis of which it can be seen that the chopper knives 48 that are distributed around the chopper drum 22 interact with a shear bar 38 in order to chop the harvested crop. The shear bar 38 is equipped with an adjusting arrangement 40 (see FIG. 2) that is arranged for the movement of the shear bar 38 in the horizontal direction towards the chopper drum 22 and away from it. It is used to adjust the size of the cutting gap. A vibration sensor 42 is arranged at both side ends of the shear bar bed 58 that supports the shear bar 38 on the frame 12.

Figure 2:
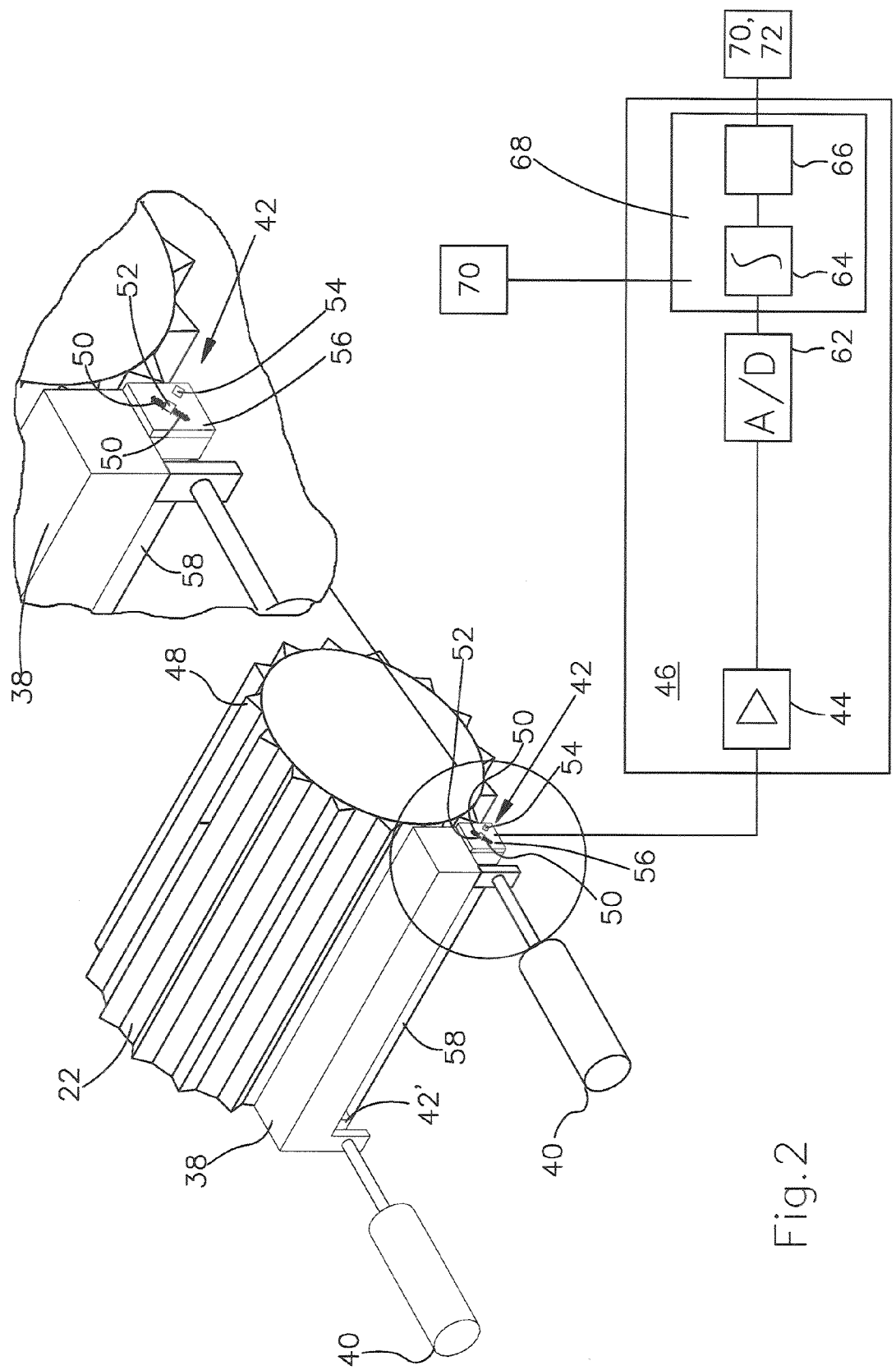
FIG. 2 is a schematic illustration of the arrangement, according to the invention.

The vibration sensor 42 fastened to the shear bar bed 58 is a component of an arrangement to determine the sharpness of the chopper knives, that is shown as a whole in FIG. 2. The vibration sensor 42 includes a mass 52 supported on springs 50 whose position can be determined by a position sensor 54 that operates, for example, capacitively or inductively. If the shear bar 38 is accelerated then the housing 56 of the vibration sensor 42 is also accelerated, the housing is preferably removable, while the mass 52 initially remains stationary due to its inertia, and is brought into motion with a time delay as a result of its suspension on springs 50. The relative motion between the housing 56 and the mass 52 is detected by the position sensor 54. The vibration sensor 42, as seen in FIG. 2, detects vibrations that extend at an angle to the front and downward along a surface of the shear bar bed 58 adjacent to the chopper drum 22, since the springs 50 extend at an angle downward and to the front. Accordingly, the sensitive direction of the vibration sensor 42 extends approximately parallel to the diagonal of the shear bar 38. The intention is that the sensitive direction of the vibration sensor 42 extends parallel to the direction in which cutting forces developed during the cutting of the harvested crop are oriented on the shear bar 38, so that the vibration sensor 42 provides information about these cutting forces. The position of the vibration sensor 42 or of at least the spring 50 and the mass 52 may be adjustable, in particular about the longitudinal axis of the shear bar bed 58 or an axis extending parallel thereto, in order to orient the sensitive direction of the vibration sensor 42 as precisely as possible in the direction of the cutting forces. As indicated in the drawing the vibration sensors 42, 42' may be arranged at both ends of the shear bar bed 58 (or at any desirable location in between). The output signals of the position sensors 54 of the vibration sensors 42, 42' are conducted to an evaluation arrangement 46 that could be arranged, for example, in the operator's cab 18. The evaluation arrangement 46 includes an amplifier 44, an analog/digital converter 62; an integration arrangement 64 and an evaluation switch arrangement 66. The amplifier 44 amplifies the incoming signals of the vibration sensor 42 and, if necessary, 42', while the analog/digital converter 62 converts the amplified output signals of the amplifier into digital quantities. The integrator 64 and the evaluation switch arrangement 66 are accordingly provided as digital switch arrangements in the form of a micro processor 68, although they could also be provided in another embodiment as an analog switch or discrete digital switches.

Figure 3:
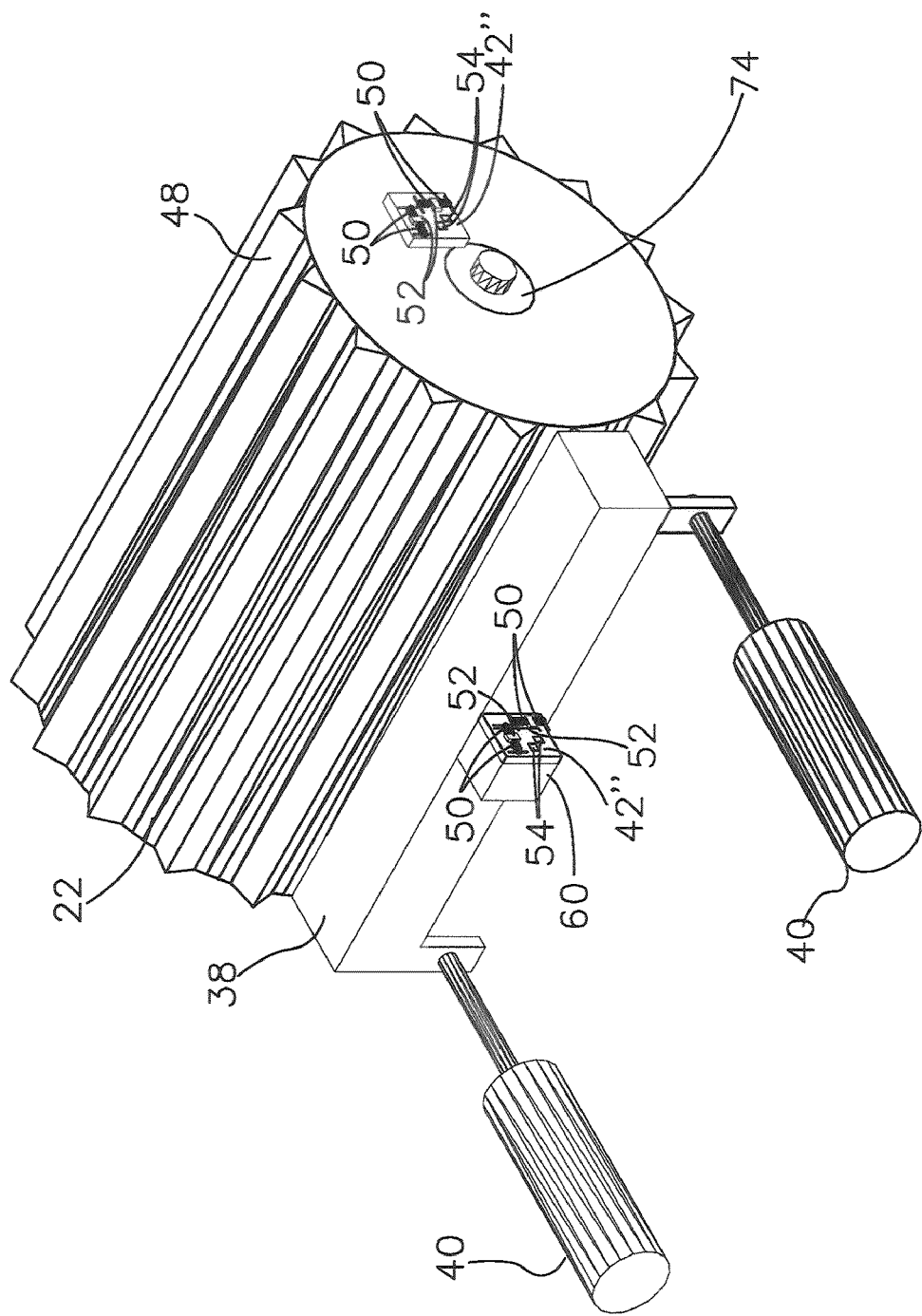
FIG. 3 is a schematic illustration of the chopper drum with other possible attachment points for the vibration sensors.

FIG. 3 shows alternative attachment possibilities and configurations for the vibration sensors 42", 42'". A possible attachment is on the surface of the shear bar 38 facing away from the chopper drum 22, at whose center the vibration sensor 42" is fastened to a retaining arrangement 60. A further attachment possibility for the vibration sensor 42'" is located at a bearing support 74, with which the chopper drum 22 is supported on the frame 12, free to rotate. As shown in FIG. 3, the vibration sensors 42" and 42'" include in each case two masses 52 and position sensors 54, whose sensitive directions extend orthogonally to each other, although they may also include another, different angle from 0° to 180°. As also shown in FIG. 2, vibration sensors of the type with two masses and position sensors, in each case with sensitive directions in the orthogonal (or including any other desired angle) direction can also be fastened to the shear bar bed 58. As a rule, the arrangement for the determination of the sharpness of the chopper knives 48 includes only a single vibration sensor 42, 42', 42", 42'", although two or more of the vibration sensors 42, 42', 42", 42'" could also be used, in order to improve the accuracy and in the case of failure of one of the vibration sensors 42, 42', 42", 42'" sufficient redundancy is available. During the evaluation the signal of the two position sensors 54 of a vibration sensor 42", 42'" could be superimposed vectorally, in that the signal x, y of the vibration sensor are squared and added and finally the square root is determined: $(x^2+y^2)^{1/2}$.

Figure 4:
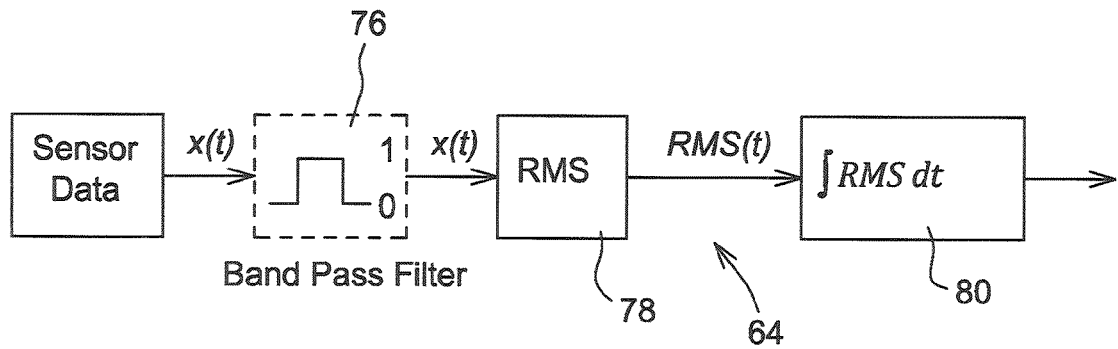
FIG. 4 is a first embodiment of an integration arrangement for the determination of the cutting force integral.

FIG. 4 shows a first embodiment of an integration arrangement 64 to determine the integral of the cutting forces, in which the signal of the vibration sensors 42, 42', 42" or 42'" are initially conducted optionally through a band pass filter 76. Then the signals are conducted through an averaging device 78 that can be performed in known manner by a rectifier and a condenser. Finally the averages of the signals are integrated over time in an integrator 80.

Figure 5:
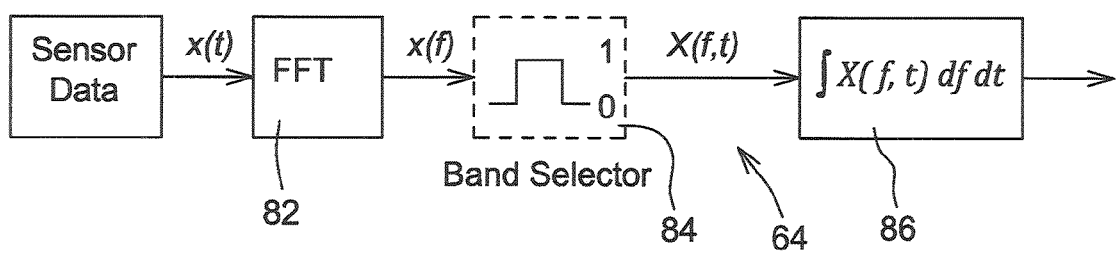
FIG. 5 is a second embodiment of an integration arrangement for the determination of the cutting force integral.

FIG. 5 shows a second embodiment of an integration arrangement 64 for the determination of the cutting force integral, with which the signals of the vibration sensors 42, 42', 42", or 42'" are initially conducted to a Fourier transformation arrangement 82. Then the signals that have been transformed by the Fourier transformation are optionally conducted through a band pass filter 84. Finally the averages of the signals that have been Fourier transformed are integrated over time and over the frequency in an integrator 86.

Figure 6:
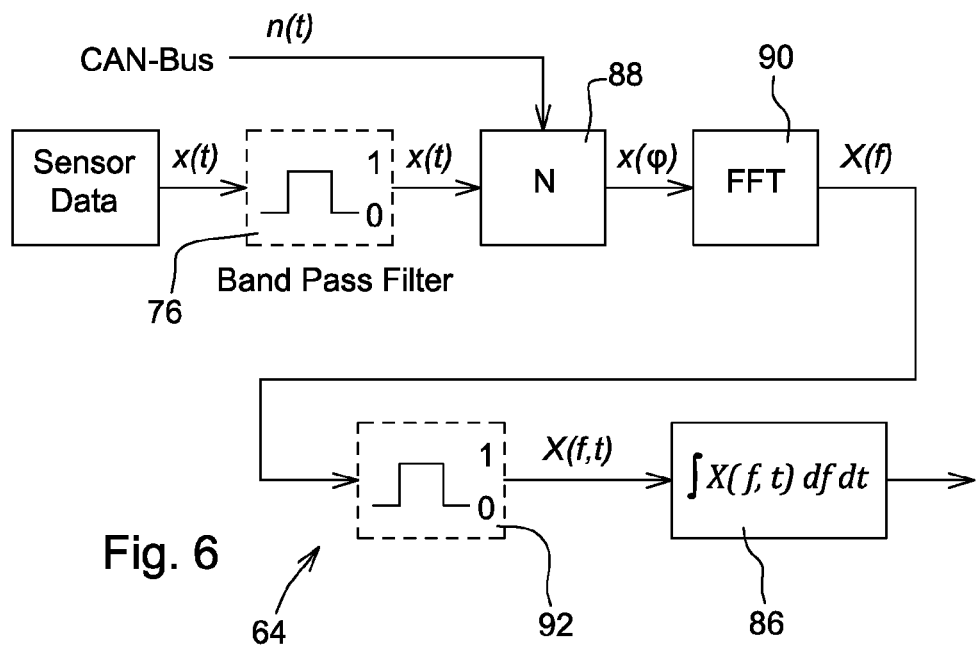
FIG. 6 is a third embodiment of an integration arrangement for the determination of the cutting force integral.

FIG. 6 shows a third embodiment of an integration arrangement 64 for the determination of the cutting force integral, in which the signals of the vibration sensors 42, 42', 42", 42'" are initially conducted optionally through a band pass filter 76. Then they are conducted to a converter 88, that converts their arrangement in time into an angular arrangement, based on the rotational speed information regarding the rotational speed of the chopper drum 22, that is conducted to it over a CAN bus. These signals are then conducted to a Fourier transformation arrangement 90. Then the Fourier transformed signals are conducted optionally through a further band pass filter 92. Finally the average values of the Fourier transformed signals are integrated up over time and over the frequency in an integrator 86.

Figure 7:
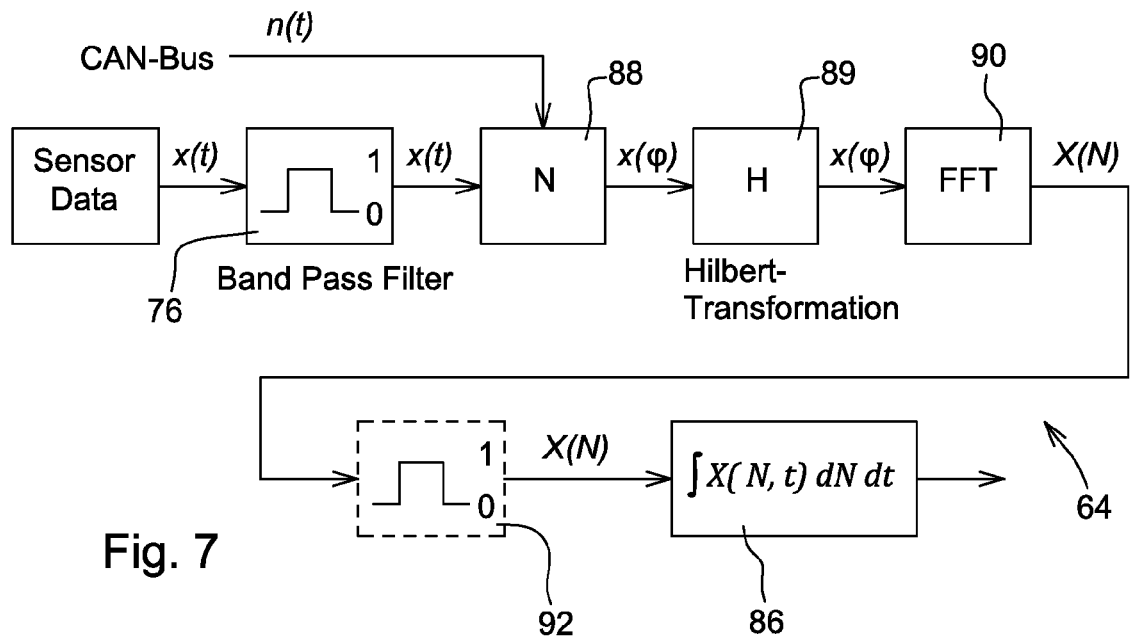
FIG. 7 is a fourth embodiment of an integration arrangement for the determination of the cutting force integral.

FIG. 7 shows a fourth embodiment of an integration arrangement 64 for the determination of the cutting force integral, in which the signals of the vibrations sensors 42, 42', 42", 42'" are initially conducted optionally through a band pass filter 76. Then they are conducted to a converter 88 that transforms its variation with time into an angular variation, that is based on a rotational speed information regarding the rotational speed of the chopper drum 22 that is conducted to it over a CAN bus. These signals are conducted to a Hilbert transformation arrangement 89 to extract the enveloping curve, and finally conducted to a Fourier transformation arrangement 90. Then the Fourier transformed signals are conducted optionally further through a band pass filter 92. Finally the averages of the Fourier transformed signals are integrated in an integrator 86 over time and over the frequency. The integral is a measure for the impact to which the chopper knives 48 have been subjected.

Figure 8:
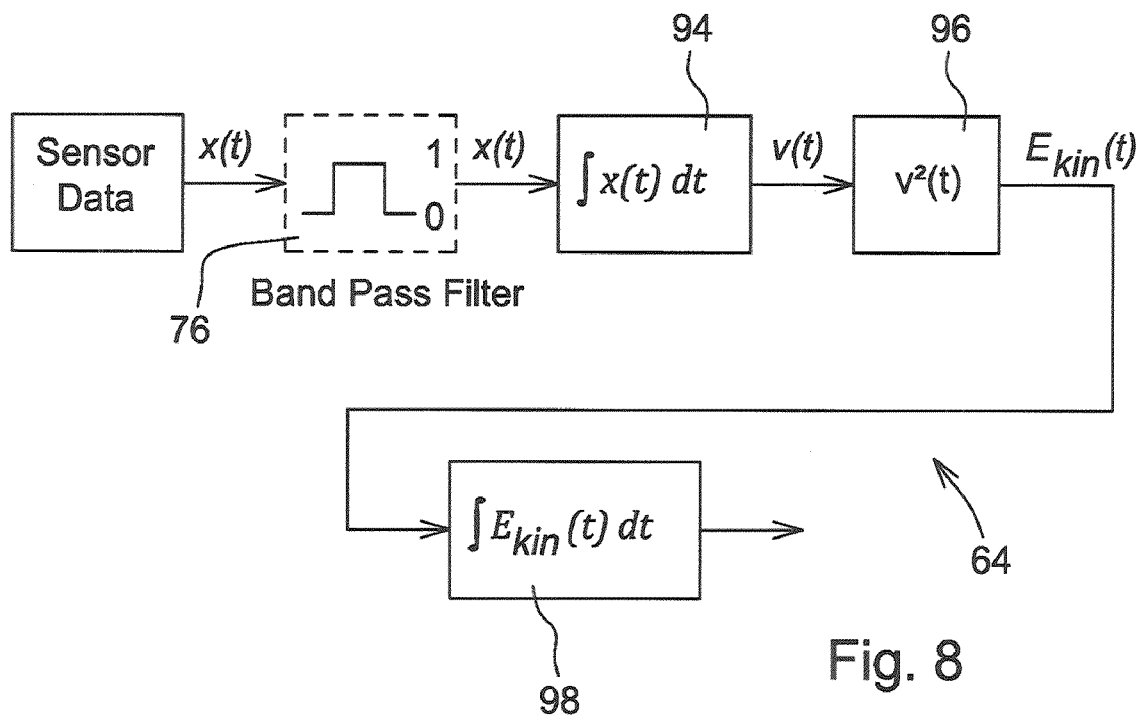
FIG. 8 is a fifth embodiment of an integration arrangement for the determination of the cutting force integral.

FIG. 8 shows a fifth embodiment of an integration arrangement 64 for the determination of the cutting force integral, in which the signals of the vibration sensors 42, 42', 42" and 42'" are initially conducted optimally through a band pass filter 76. Then they are conducted to a first integrator 94. The integration of the signals of the vibration sensors 42, 42', 42" and 42'" results in a velocity, since the vibration sensor 42, 42', 42" and 42'" for their part detect the accelerations. This velocity is then squared in a squaring device 96 in order to determine the kinetic energy, which is then finally integrated over time in a further integrator 98.

Figure 9:
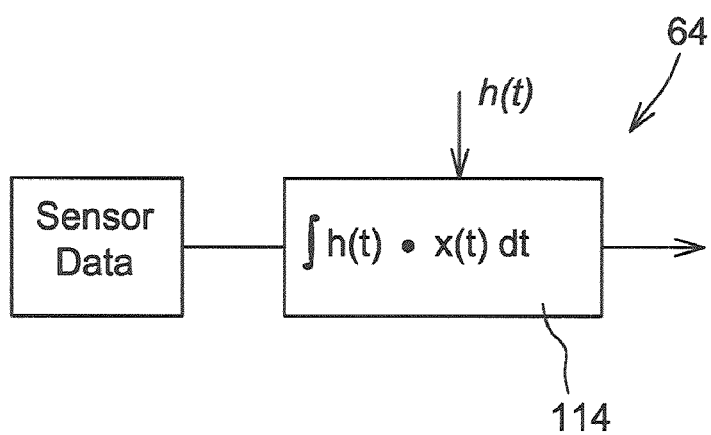
FIG. 9 is a sixth embodiment of an integration arrangement for the determination of the cutting force integral.

FIG. 9 shows a sixth embodiment of an integration arrangement 64 for the determination of the cutting force integral, in which the signals of the vibration sensors 42, 42' 42" or 42'" are multiplied by a magnitude h and then integrated over time in the integrator 114. The magnitude h corresponds to the thickness of the layer of the chopped harvested crop mass and is detected, for example, by means of a sensor that detects the distance between the upper pre-pressing rolls 34, 36 and the lower pre-pressing rolls 30, 32. Here the cutting energy is determined, that results from multiplication of the path h (thickness of the layer) with the cutting force. The latter is measured here on the basis of the acceleration that is proportional to it that is detected by means of the vibration sensors 42, 42', 42" and 42'.

Figure 10:
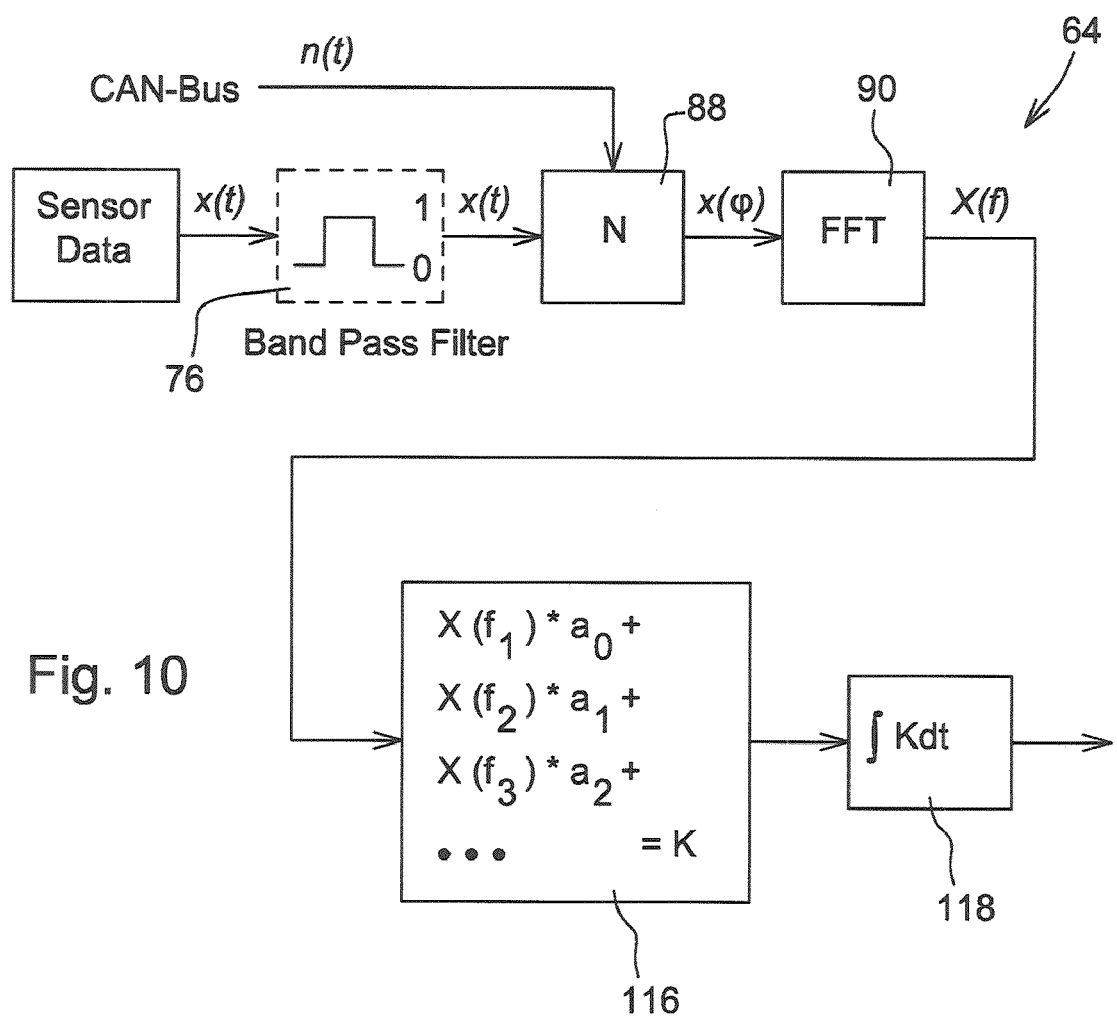
FIG. 10 is a seventh embodiment of an integration arrangement for the determination of the cutting force integral; and, FIG. 11 is a flow chart according to which the evaluation arrangement of the arrangement operates.

FIG. 10 shows a seventh embodiment of an integration arrangement 64 for the determination of the cutting force integral. Analogous to the embodiment according to FIG. 6 the signals of the vibration sensors 42, 42', 42", 42''' are conducted initially optionally through a band pass filter 76. Then they are conducted to a converter 88, that converts a timely arrangement into an angular arrangement, based upon the rotational speed information concerning the rotational speed of the chopper drum 22, that is conducted to it over a CAN bus. These signals are then conducted to a Fourier transformation arrangement 90. A calculating arrangement 116 then has a signal x(f) available, that reproduces the immediate amplitude x of the detected vibration at the frequencies f. The cutting interference or knife contact frequency, that is, the number of the cutting processes that each of the chopper knives 48 performs per unit of time, is designated as $f_1$, while the second, third or n-multiple of the cutting frequency (that is the higher harmonics) are denoted as $f_2$, $f_3$, and $f_n$. In the calculating arrangement 116, the amplitude $x_1$ at the cutting factor $f_1$ is multiplied by a weighting factor $a_1$. Furthermore, the amplitude $x_2$ at the second harmonic $f_2$ of the cutting frequency is multiplied by a weighting factor $a_2$ and added to it, as well as the amplitude $x_3$ at the third harmonic $f_3$ of the cutting frequency multiplied by a weighting factor $a_3$ and added to it. This summation is performed up to an upper harmonic n, that may for example, amount to 5 or 12. In this way a characteristic K is determined in the calculating arrangement 116 that is then integrated upward in an integrator 118 over time in order to determine the cutting force integral.

Figure 11:
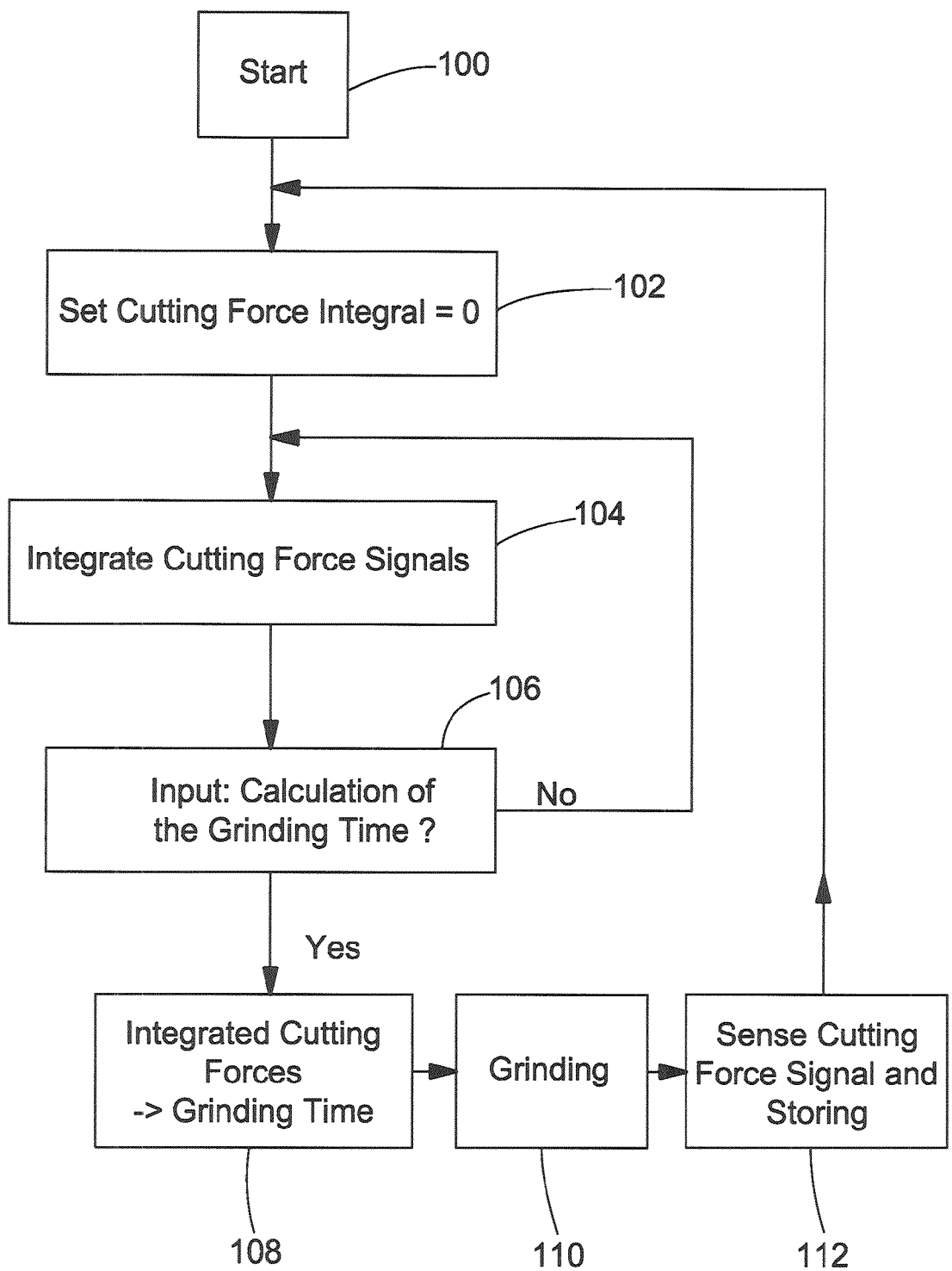

In the following the method of operation of the evaluation arrangement 46 is explained on the basis of the flow chart shown in FIG. 11. After the start in step 100, in the following step 102 the integrator 64 is set to zero, so that the cutting force integral that was stored in memory there is initially set back. In the following step 104 the incoming vibration signals from the vibration sensors 42, 42' are integrated upward in the integration arrangement 64, for example, that are shown or described on the basis of one or more or all of FIGS. 4 through 9.

Step 106 follows, in which the micro processor 68 inquires whether an input has occurred according to which a calculation of the duration of the grinding process is to be performed. If this is not the case, step 104 again follows, while on the other hand, step 108 is performed, in which the signals that were integrated in the integration arrangement 64 are utilized by the evaluation arrangement 66, in order to calculate an adequate grinding duration, that makes it possible to provide an adequate sharpness of the chopper knives 48 by means of a grinding arrangement. Accordingly the possibility is offered to perform the grinding process at an appropriate time, for example, during operation on public roads or during a pause in the harvesting process in order to calculate the proper duration of the grinding process automatically. Here the results of the integration arrangement 64, according to one or more or all of the FIGS. 4 through 10 can be used individually or in any combination, where in step 108 for example in every case the integrated signal of FIGS. 4 through 10 is used for the calculation of the duration of the grinding process that results in the longest grinding duration, or an average is used among the results of the integration arrangement 64 of the FIGS. 4 through 10.

In the individual case a calculation can be performed as to how long a grinding stone of the grinding arrangement 72 is to be moved back and forth across the width of the chopper drum 22, or the number of movements across the width of the chopper drum 22 is determined, where a fixed movement velocity is defined as the starting point. The time of the grinding process across the width of the chopper drum 22 can also be selected differently, in order to take into account more or less wear in the area of the center of the chopper drum 22 in contrast to the outer sides. For this purpose reference should be made to DE10035742A1, whose disclosure is incorporated by reference into the present document. Moreover, a correction factor can be provided as input by means of the operator input arrangement 70, in order to affect the recommended number of grinding operations or the duration of grinding upward or downward in order to account for, for example, material properties such as the hardness of the harvested crop or the quality of the chopper knives 48. Furthermore, a calibration characteristic provided as input into the evaluation arrangement 66 can be used to compensate for a non-linear relationship between the signal detected by the vibration sensor 42 and the sharpness of the chopper knives 48. Finally, step 108 considers the degree of sharpness the chopper knives 48 should reach after the grinding process. This information is recalled from a memory that applied during a previous course through the flow chart of FIG. 3 that has been associated with a value for the signals of the vibration sensors 42 immediately after a grinding process (compare step 112). Alternatively information about the sharpness that is to be reached could be provided as a fixed input and stored in memory.

If the micro processor 68 should not be in a position to integrate simultaneously further signals of the cutting force (step 104) during step 108, the signals received during the time for step 108 can be interpolated statistically. Then in step 110 a grinding process is performed by means of the grinding arrangement 72 that can be controlled automatically by the evaluation arrangement 46. Moreover, the number and/or the duration of the total number of grinding processes that are to be performed, that have been performed or missing grinding processes are displayed on the operator's input arrangement 70. Step 112 follows step 110, in which, during a subsequent grinding process a signal of the cutting force is detected over a sufficiently long period of time and is stored in memory. This value stored in memory is required in the following step 108. Then step 102 again follows.

Having described the preferred embodiment, it will become apparent that various modifications can be made without departing from the scope of the invention as defined in the accompanying claims.

The invention claimed is:

1. An arrangement for the determination of the sharpness of chopper knives that can be moved relative to a shear bar, the arrangement having a sensor for the detection of a value depending on a cutting force and an evaluation arrangement, wherein the evaluation arrangement is operated so as to integrate over time signals based upon measured values of the sensor in order to generate a cutting force integral which is usable as information regarding the sharpness of the chopper knives.

2. An arrangement according to claim 1, wherein the evaluation arrangement is arranged to determine at least one of the duration of a grinding process and the number of grinding processes with which the chopper knives can be brought again into a sharpened condition, based on the information gained regarding the sharpness of the chopper knives.

3. An arrangement according to claim 2, wherein the evaluation arrangement is arranged to use as the sharpened condition one of the condition of the chopper knives after the last grinding process and a reference sharpened condition.

4. An arrangement according to claim 2, wherein the evaluation arrangement is provided with a correction factor for at least one of the grinding duration and the number of grinding processes.

5. An arrangement according to claim 1, wherein the sensor includes at least one vibration sensor.

6. An arrangement according to claim 5, wherein the vibration sensor is at least one of a sensor sensitive in a direction of the cutting forces and is sensors sensitive in different directions orthogonal to each other, whose signals are associated in both directions and that are superimposed vectorally in such a way that the resulting signal is a measure for the vibration extending in the direction of the cut.

7. An arrangement according to claim 5, wherein the vibration sensor is fastened to at least one of the shear bar and the bed of the shear bar and a bearing arrangement of the chopper drum.

8. An arrangement according to claim 5, wherein the evaluation arrangement is operated so as to conduct a frequency analysis of a vibration detected by the at least one vibration sensor in order to detect the amplitudes of the vibrations at the cutting frequency and at its harmonic and to calculate a characteristic based upon it that is integrated over time.

9. An arrangement according to claim 8, wherein the evaluation arrangement is operated so as to one of: sum up the weighted amplitudes of the cutting frequencies and their harmonics; and determine from it the spectral power density in order to calculate the characteristic.

10. An arrangement according to claim 1, wherein the evaluation arrangement is arranged to filter the signals of the sensor, where the limiting frequencies of the filtration arrangement are provided as one of a fixed and variable input.

11. An arrangement according to claim 1, wherein the evaluation arrangement is operated on the basis of an enveloping curve of the signals of the sensor.

12. An arrangement according to claim 1, wherein the evaluation arrangement is operated on the basis of the signals of the sensor and a detected thickness of the layer of a cut harvested crop mass in order to determine a cutting energy.

13. An arrangement according to claim 1, wherein the evaluation arrangement is operated in order to perform an analysis of the detected signals of the sensor.

14. An arrangement according to claim 1, wherein the evaluation arrangement is provided with a calibration characteristic with which it compensates for a non-linear course between the signals of sensors detected and the sharpness of the chopper knives.

15. A process for the determination of the sharpness of chopper knives that can be moved relative to a shear bar, using a sensor for the detection of a magnitude depending on a cutting force, and an evaluation arrangement connected with the sensor, comprising the step of, detecting a value dependent upon an cutting force and integrating signals based upon the measured values of the sensor over time in order to generate information regarding the sharpness of the chopper knives.

* * * * *